United States Patent
Silny et al.

(10) Patent No.: US 10,151,632 B2
(45) Date of Patent: Dec. 11, 2018

(54) SIMULTANEOUS OVERLAPPING ORDER SPECTRAL IMAGER AND METHOD

(71) Applicant: RAYTHEON COMPANY, Waltham, MA (US)

(72) Inventors: John F. Silny, Playa Vista, CA (US); Bradley A. Flanders, Whittier, CA (US)

(73) Assignee: RAYTHEON COMPANY, Waltham, MA (US)

( * ) Notice: Subject to any disclaimer, the term of this patent is extended or adjusted under 35 U.S.C. 154(b) by 135 days.

(21) Appl. No.: 15/270,942

(22) Filed: Sep. 20, 2016

(65) Prior Publication Data

US 2018/0080826 A1 Mar. 22, 2018

(51) Int. Cl.
G01J 3/28 (2006.01)
G01J 3/18 (2006.01)
G01J 3/12 (2006.01)

(52) U.S. Cl.
CPC .............. G01J 3/2823 (2013.01); G01J 3/18 (2013.01); G01J 3/2803 (2013.01); G01J 2003/1204 (2013.01); G01J 2003/1273 (2013.01); G01J 2003/2826 (2013.01)

(58) Field of Classification Search
CPC .... G01J 3/2823; G01J 3/18; G01J 2003/2826; G01J 2003/1204; G01J 3/2803; G01J 2003/1273
See application file for complete search history.

(56) References Cited

U.S. PATENT DOCUMENTS

| 2,995,973 | A | 8/1961 | Bowling et al. | |
|---|---|---|---|---|
| 6,104,488 | A | 8/2000 | LeVan | |
| 8,334,975 | B1 | 12/2012 | Cook | |
| 2004/0109159 | A1 | 6/2004 | Schau | |
| 2004/0257563 | A1* | 12/2004 | Miller | G01J 3/28 356/328 |
| 2005/0174584 | A1* | 8/2005 | Chalmers | G01B 11/0625 356/630 |
| 2010/0013979 | A1* | 1/2010 | Golub | G01J 3/2803 348/340 |
| 2013/0327942 | A1 | 12/2013 | Silny | |
| 2016/0138974 | A1 | 5/2016 | Silny | |

OTHER PUBLICATIONS

International Search Report and Written Opinion for application No. PCT/US2017/042850 dated Oct. 12, 2017.
Mouroulis et al., "Optical design of a coastal ocean imaging spectrometer", Optics Express, vol. 16, No. 12, pp. 9087-9096 (Jun. 9, 2008).

* cited by examiner

Primary Examiner — Que T Le
Assistant Examiner — Jennifer Bennett
(74) Attorney, Agent, or Firm — Lando & Anastasi, LLP

(57) ABSTRACT

An imaging spectrometer and method are provided. In one example, the imaging spectrometer includes foreoptics positioned to receive electromagnetic radiation from a scene, a diffraction grating positioned to receive the electromagnetic radiation from the foreoptics and configured to disperse the electromagnetic radiation into a plurality of spectral bands, each spectral band corresponding to a diffraction grating order of the diffraction grating, and a single-band focal plane array configured to simultaneously receive from the diffraction grating overlapping spectra corresponding to at least two diffraction grating orders.

19 Claims, 8 Drawing Sheets

SIMULTANEOUS OVERLAPPING ORDER SPECTRAL IMAGER AND METHOD

BACKGROUND

Imaging spectroscopy is widely used in many remote sensing applications. For instance, collected spectral data is often used for automated remote material detection, identification, and quantification. While providing a variety of functionality, typical imaging spectrometers require a compromise between spectral resolution and a wide area of spatial coverage. Accordingly, typical imaging spectrometers are optimized differently depending on the intended application. For instance, some systems include multiple imaging detectors to accommodate numerous spectral bands of detection at the expense of size, weight, and power requirements. However, in other instances systems may include an imaging detector configured to offset spectral bands in a spatial or spectral dimension at the expense of other undesirable effects.

SUMMARY OF THE INVENTION

Aspects and examples are generally directed to imaging spectrometers, systems, and imaging methods. In one particular example, an imaging spectrometer includes an imaging detector with a plurality of pixel elements each configured to intentionally collect overlapping spectral bands from a diffraction grating, the overlapping spectral bands corresponding to at least two diffraction grating orders. As discussed in further detail below, aspects and examples provide improved grating optimization to collect more energy per pixel element of the imaging detector when compared to conventional imaging spectrometers. Accordingly, such aspects and examples reduce the effects of sensor noise, achieve an improved signal-to-noise ratio, and/or achieve a larger area coverage rate when compared to conventional imaging spectrometers.

According to an aspect, provided is an imaging spectrometer. In one example, the imaging spectrometer comprises foreoptics positioned to receive electromagnetic radiation from a scene, a diffraction grating positioned to receive the electromagnetic radiation from the foreoptics and configured to disperse the electromagnetic radiation into a plurality of spectral bands, each spectral band corresponding to a diffraction grating order of the diffraction grating, and a single-band focal plane array configured to simultaneously receive from the diffraction grating overlapping spectra corresponding to at least two diffraction grating orders.

According to one example, the plurality of spectral bands includes at least a first spectral band and a second spectral band, the first spectral band including a first range of wavelengths, and the second spectral band including a second range of wavelengths. In one example, the single-band focal plane array includes a plurality of pixel elements, and in simultaneously receiving the overlapping spectra, at least one pixel element of the plurality of pixel elements is configured to simultaneously receive a first center wavelength of electromagnetic radiation within the first range of wavelengths and a second center wavelength of electromagnetic radiation within the second range of wavelengths.

In one example, the imaging spectrometer further comprises a filter system configured to direct the electromagnetic radiation to the foreoptics, the filter system including at least a first filter having a first passband corresponding to the first range of wavelengths and the second range of wavelengths. In an example, the filter system further includes a second filter having a second passband corresponding to the first range of wavelengths and a third filter having a third passband corresponding to the second range of wavelengths. According to an example, the filter system is a filter wheel positioned to selectively receive the electromagnetic radiation at one of the first filter, the second filter, and the third filter. In an example, the imaging spectrometer further comprises an order sorting filter interposed between the diffraction grating and the single-band focal plane array.

According to an example, the plurality of spectral bands further includes a third spectral band, the third spectral band including a third range of wavelengths. In one example, the single-band focal plane array includes a plurality of pixel elements, and in simultaneously receiving the overlapping spectra, at least one pixel element of the plurality of pixel elements is configured to simultaneously receive a first center wavelength of electromagnetic radiation within the first range of wavelengths, a second center wavelength of electromagnetic radiation within the second range of wavelengths, and a third center wavelength of electromagnetic radiation within the third range of wavelengths.

In an example, the first spectral band includes at least one of the near-infrared spectral band, the short-wavelength infrared spectral band, the mid-wavelength infrared spectral band, the long-wavelength infrared spectral band, and the visible spectral band, and the second spectral band includes at least one of the near-infrared spectral band, the short-wavelength infrared spectral band, the mid-wavelength infrared spectral band, the long-wavelength infrared spectral band, and the visible spectral band. In one example, the at least two diffraction grating orders include a pair of consecutive diffraction grating orders. In an example, the at least two diffraction grating order include a pair of non-consecutive diffraction grating orders.

According to an example, the imaging spectrometer further comprises a slit aperture interposed between the foreoptics and the diffraction grating and configured to direct the electromagnetic radiation to the diffraction grating.

According to an aspect, provided is an imaging method. In one example, the imaging method comprises receiving electromagnetic radiation from a scene, directing the electromagnetic radiation onto a diffraction grating, receiving the electromagnetic radiation at the diffraction grating and dispersing the electromagnetic radiation into a plurality of spectral bands, each spectral band corresponding to a diffraction grating order of the diffraction grating, and simultaneously collecting at a single-band focal plane array overlapping spectra corresponding to at least two diffraction grating orders of the diffracting grating.

In one example, dispersing the electromagnetic radiation into a plurality of spectral bands includes dispersing the electromagnetic radiation into at least a first spectral band including a first range of wavelengths and a second spectral band including a second range of wavelengths. According to an example, simultaneously collecting the overlapping spectra further includes receiving a first center wavelength of electromagnetic radiation within the first range of wavelengths and receiving a second center wavelength of electromagnetic radiation within the second range of wavelengths at one or more pixel element of the single-band focal plane array. In one example, the imaging method further comprises filtering the received electromagnetic radiation with a filter having a passband corresponding to the first range of wavelengths and the second range of wavelengths.

In an example, dispersing the electromagnetic radiation into a plurality of spectral bands further includes dispersing the electromagnetic radiation into a third spectral band including a third range of wavelengths. In one example, simultaneously collecting the overlapping spectra further includes receiving a first center wavelength of electromagnetic radiation within the first range of wavelengths, receiving a second center wavelength of electromagnetic radiation within the second range of wavelengths, and simultaneously receiving a third center wavelength of electromagnetic radiation within the third range of wavelengths, at one or more pixel element of the single-band focal plane array.

According to one example, the first spectral band includes at least one of the near-infrared spectral band, the short-wavelength infrared spectral band, the mid-wavelength infrared spectral band, the long-wavelength infrared spectral band, and the visible spectral band, and the second spectral band includes at least one of the near-infrared spectral band, the short-wavelength infrared spectral band, the mid-wavelength infrared spectral band, the long-wavelength infrared spectral band, and the visible spectral band. In an example, receiving electromagnetic radiation from the scene includes selectively positioning at least one filter to receive and direct the electromagnetic radiation.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and examples are generally directed to imaging spectrometers, systems, and imaging methods. Imaging spectrometers are typically used to provide an image and spectral analysis in one or more wavelengths of interest. Spectral images and analysis may be used for automated remote material detection, identification, and quantification. Aspects and examples discussed herein are designed such that in at least one mode of operation, overlapping spectral data corresponding to two or more diffraction grating orders of a diffraction grating is simultaneously received at a single-band focal plane array. In particular, a wavelength of electromagnetic radiation corresponding to a first spectral band and a first diffraction grating order may be simultaneously collected and imaged at the same pixel element as is a second wavelength of electromagnetic radiation corresponding to a second spectral band and a second diffraction grating order. As discussed in further detail below, aspects and examples may reduce the effects of sensor noise within the imaging spectrometer, achieve an improved signal-to-noise ratio, and/or achieve a larger area coverage rate when compared to conventional imaging spectrometers.

Figure 1:
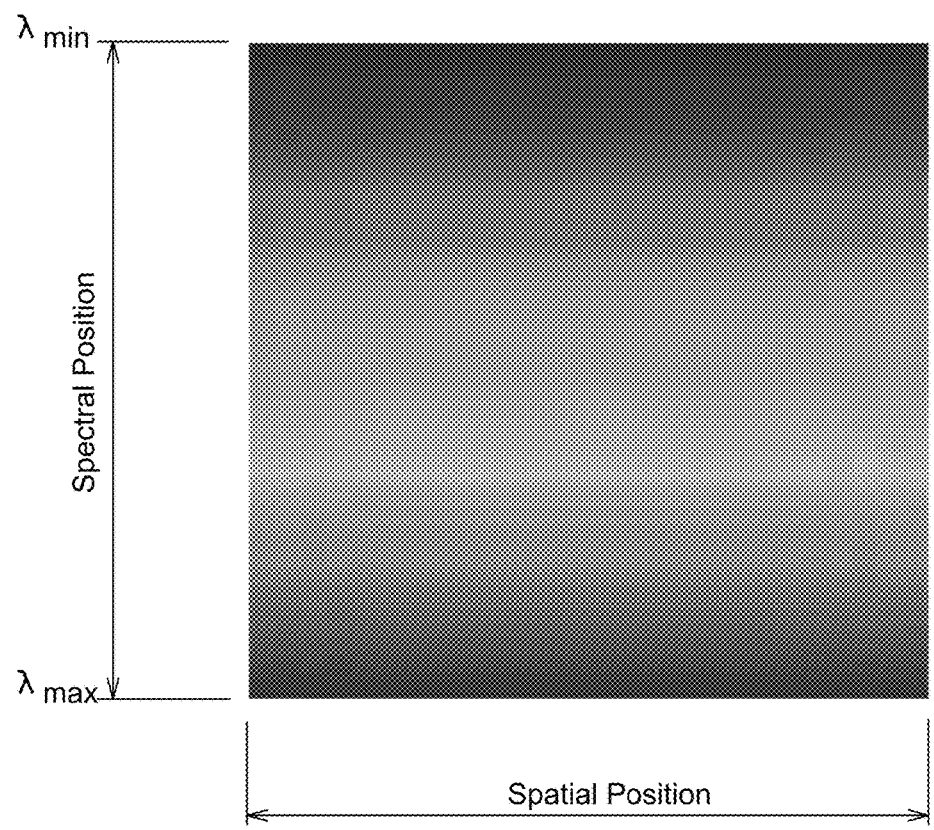
FIG. 1 is a block diagram of one example of a typical imaging detector configured for hyper-spectral imaging within a single spectral band.

In many instances it is desirable to have an imaging spectrometer that is capable of a wide area of spatial coverage and a fine spectral resolution. However, often these design goals are competing interests and optimization requires a balance between spectral resolution and the area of coverage, or optimization of one design goal at the sacrifice of other operating parameters such as size, weight, power, and cost. For example, some approaches for hyper-spectral imaging in multiple spectral bands have used multiple focal plane arrays, each array being designated for a particular contiguous wavelength range of radiation. For example, FIG. 1 illustrates one example of typical imaging detector configured for hyper-spectral imaging within a single spectral band (e.g., $\lambda_{min}$ to $\lambda_{max}$). However, an arrangement of multiple focal plane arrays increases the size, weight, and power constraints of the imaging spectrometer, which can make operating in certain applications and conditions especially challenging. Other approaches for multi-band collection have included imaging spectrometers with diffraction gratings that block diffraction grating orders to sort one or more spectral bands. For example, these approaches may include an order sorting filter configured to block spectra corresponding to overlapping spectral orders and direct spectra of a single nominal wavelength to each spectra channel of the corresponding imaging detector.

Figure 2:
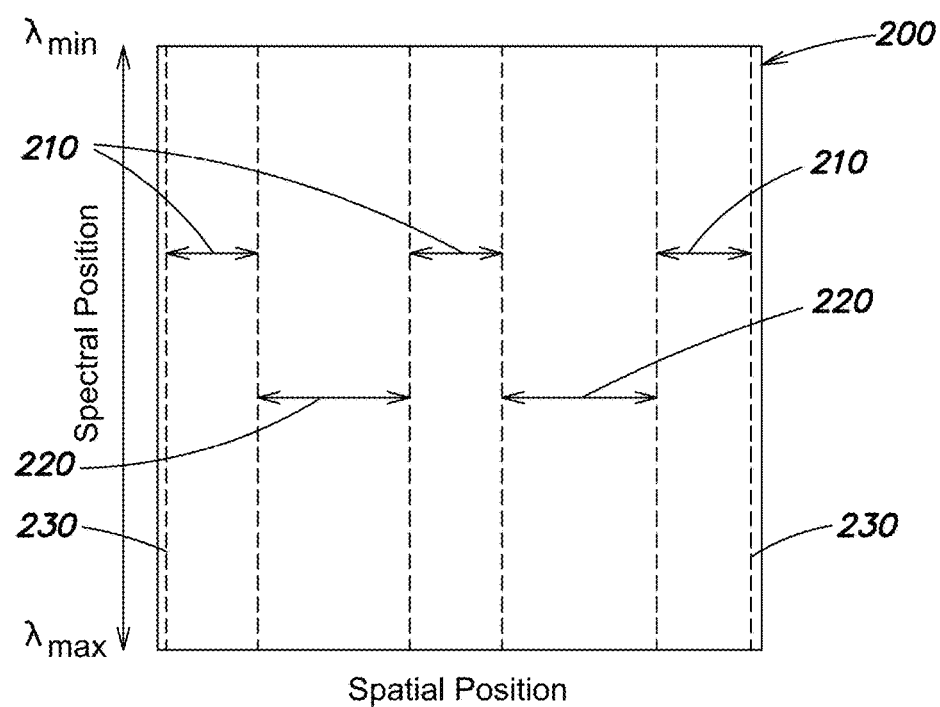
FIG. 2 is a block diagram of one example of a typical imaging detector configured for hyper-spectral imaging in multiple spectral bands.

In other instances, some prior approaches for multi-band detection have included imaging spectrometers designed to collect multiple orders of electromagnetic radiation, but with an offset in one of a spatial dimension or a spectral dimension. For instance, one approach utilizes multiple entrance slits to spatially separate different spectral bands to appropriate areas of an imaging detector. In such an arrangement, a three-band spectrometer may use three entrance slits positioned between the foreoptics and the focal plane array. FIG. 2 illustrates an example of a focal plane array sensor 200 having three regions 210 each responsive to a different spectral band. As shown, the regions 210 are spatially separated from one another by guard zones 220. The focal plane array 200 may also be configured to include edge tolerance regions 230, which may be 22 pixels across, for example. In the shown arrangement, and similar approaches which utilize an offset in a spatial dimension to image multi-band electromagnetic radiation, each spectral channel receives a single nominal wavelength at a given region (e.g., regions 210).

Figure 3:
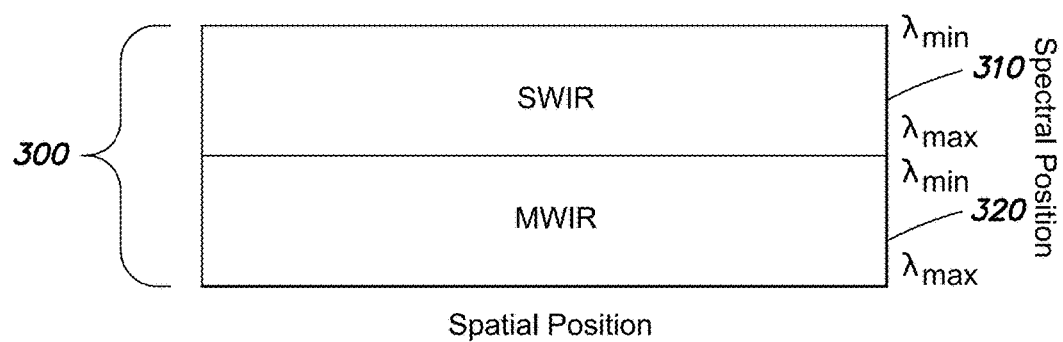
FIG. 3 is a block diagram of a further example of a typical imaging detector configured for hyper-spectral imaging in multiple spectral bands.

Similarly, other prior approaches for multi-band collection have included imaging spectrometers designed to collect multiple orders of electromagnetic radiation, but with an offset in a spectral dimension. FIG. 3 illustrates one example of a typical focal plane array 300 configured to support a two-band device and including regions 310, 320 where two different spectral bands fall. For instance, region 310 may be where the first spectral band falls, and region 320 may be where the second spectral band falls. In such an arrangement, each spectral channel of the associated imaging detector is configured to receive a single nominal wavelength per spectral channel.

In contrast to the above-discussed approaches, aspects and examples discussed herein are directed to an imaging spectrometer which intentionally collects overlapping spectral data. That is, in various examples the imaging spectrometer is configured to collect multiple nominal center wavelengths per spectral channel of an associated imaging detector. As discussed in more detail below, particular examples may include a diffraction grating having a plurality of diffraction grating orders, each diffraction grating order producing a corresponding spectral band of spectrally dispersed electromagnetic radiation. In contrast to typical approaches which suggest filtering, blocking, or otherwise removing overlapping spectra corresponding to neighboring diffraction grating orders, various aspects and examples collect and image this overlapping spectral data. Accordingly, aspects and examples provide improved grating optimization to collect more energy per pixel element of the focal plane array. As discussed further below, such aspects and examples consequently achieve an improved signal-to-noise ratio and/or achieve a larger area coverage rate when compared to conventional imaging spectrometers.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 4:
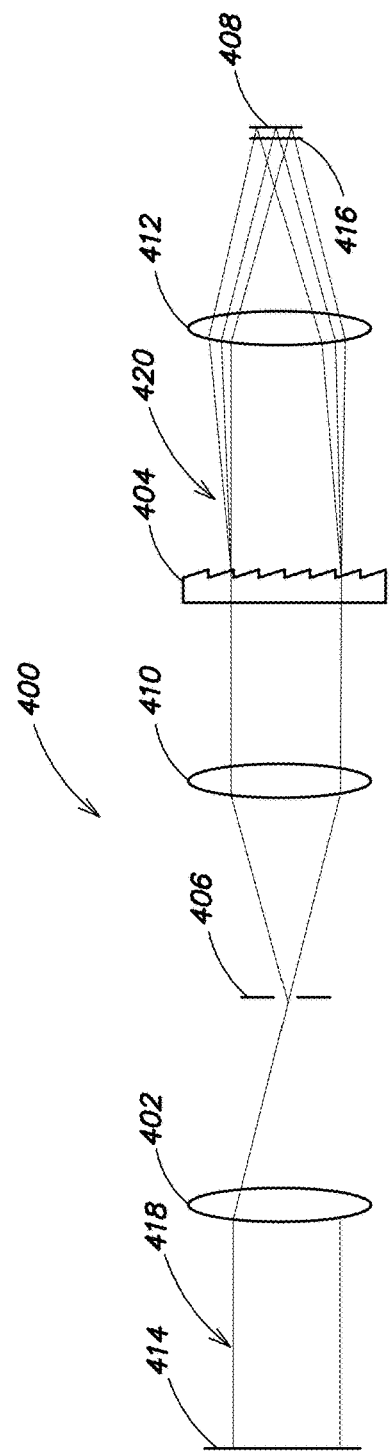
FIG. 4 is a block diagram of one example of an imaging spectrometer according to aspects of the invention.

Referring to FIG. 4, there is illustrated a block diagram of one example of an imaging spectrometer 400 according to various aspects and embodiments. According to certain examples, the imaging spectrometer 400 may include a compact multi-band imaging spectrometer configured to simultaneously image multiple spectral bands, such as multiple wavelength ranges within the near-infrared (NIR) spectral band, the short-wavelength infrared (SWIR) spectral band, the mid-wavelength infrared (MWIR) spectral band, the long-wavelength infrared (LWIR) spectral band, and the visible spectral band. In the example shown of FIG. 4, the imaging spectrometer 400 includes foreoptics 402, a diffraction grating 404, a slit aperture 406, and an imaging detector (e.g., a single-band focal plane array 408). As further shown, the imaging spectrometer 400 may include collimating optics 410, focusing and/or imaging optics 412, a filter system 414, and/or an order sorting filter 416.

As shown, the slit aperture 406 of the imaging spectrometer 400 includes a single entrance slit through which incident electromagnetic radiation 418 is received. As discussed herein, electromagnetic radiation (also referred to as "white light") is collected by the foreoptics 402 and directed to the slit aperture 406. In various embodiments, electromagnetic radiation refers to the radiant energy received from a scene to be imaged, and may include visible light, infrared radiation, and/or ultraviolet radiation, to name a few examples. The foreoptics 402 may include any suitable objective optical system positioned to receive the electromagnetic radiation, such as a single lens or mirror, or a combination of mirrors or lenses. In one example, the foreoptics 402 include an objective lens system, as shown. However in various other embodiments, the foreoptics 402 may include an all-reflective objective, which may be constructed solely of reflective optics (e.g., mirrors) and characterized by the absence of transmissive optics (e.g., lenses). For instance, the foreoptics 402 may include a reflective triplet, having a primary objective mirror, a second mirror, and an objective tertiary mirror. In certain other examples, other suitable arrangements of lenses and/or mirrors may be used to collect electromagnetic radiation.

Electromagnetic radiation 418 collected by the foreoptics 402 is directed to the slit aperture 406. As illustrated in the shown example of FIG. 4, in certain embodiments the imaging spectrometer 400 includes additional optics configured to focus, collimate, disperse, and/or image the received electromagnetic radiation. In one example, the slit aperture 406 includes a single slit aperture interposed between the foreoptics 402 and the diffraction grating 404. In response to receiving the electromagnetic radiation 418 from the foreoptics 402, the slit aperture 406 is configured to direct the electromagnetic radiation 418 to the diffraction grating 404. In the shown example, one or more collimating optics may be interposed between the slit aperture 406 and the diffraction grating 404 to collimate the electromagnetic radiation 418 directed to the diffraction grating 404. For example, the collimating optics 402 may include any suitable collimator, such as collimating lenses and/or mirrors configured to align one or more rays of the received electromagnetic radiation 418 and substantially reduce a cross-section thereof.

Still referring to FIG. 4, the diffraction grating 404 is configured and positioned to receive the electromagnetic radiation 418 from the slit aperture 406. In particular examples, the electromagnetic radiation 418 received at the diffraction grating 404 includes collimated electromagnetic radiation 418 directed by the collimating optics 402. While shown in FIG. 4 as a transmissive diffraction grating, in various other examples, the diffraction grating 404 may include a reflective diffraction grating. Moreover, in certain examples, the diffraction grating 404 may be replaced with any other suitable diffractive element, such as a grating prism (i.e., a "grism"). Parameters of the diffraction grating 404, such as size, clear aperture, grating groove density, grating groove profile (including blaze angle), and diffraction orders, may be chosen based on the particular application and operating parameters of the imaging spectrometer 400.

The diffraction grating 404 disperses the electromagnetic radiation 418 into a plurality of spectral bands 420, each spectral band having a range of associated wavelengths. For instance, a surface of the diffraction grating 404 may have a plurality of grooves, each of which splits and diffracts the incident electromagnetic radiation 418 along a different output path based on wavelength and diffraction order. In various embodiments, each spectral band dispersed by the diffraction grating 404 may correspond to one or more particular diffraction grating orders of the diffraction grating 404. In particular, the blaze angle(s) of the diffraction grating may be selected to optimize overall performance of sensor (e.g., focal plane array 408) relative to the signal-to-noise ratio (SNR). For example, optimized performance may be based on figure of merit, such as minimum SNR or SNR uniformity.

Figure 5:
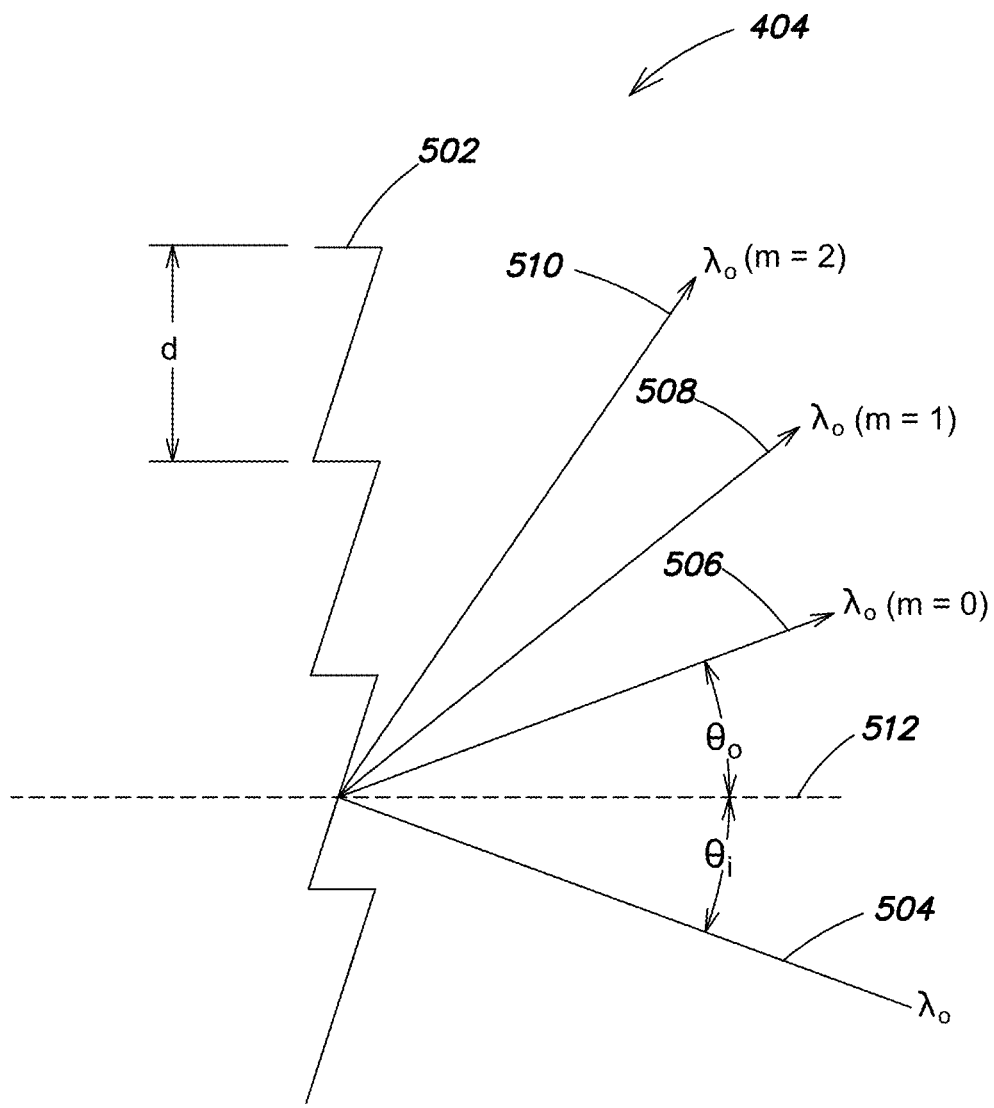
FIG. 5 is an example diffraction grating according to aspects of the invention.

Turning briefly to FIG. 5, shown is one example illustration of the operation of the diffraction grating 404 of the imaging spectrometer 400. In the shown example, the diffraction grating 404 is illustrated as a reflective diffraction grating having a series of periodically spaced grooves 502.

In response to receiving a beam of electromagnetic radiation 504, the diffraction grating 404 disperses the electromagnetic beam 504, directing each wavelength in a plurality of directions corresponding to the different diffraction orders of the grating 404. In FIG. 5, a single incident wavelength, represented by $\lambda_o$, of the beam of electromagnetic radiation 504 is shown (e.g., received at angle $\theta_i$). In the illustrated example, this wavelength, $\lambda_o$, is reflected from the diffraction grating 404 at three different angles relative to an optical axis of the diffraction grating (illustrated as ghost line 512), corresponding to three different diffraction orders of the grating 404. The diffraction grating orders are shown including an ordinal value increasing in number with distance from an axis of direct transmission (illustrated as ray trace 506 at angle $\theta_o$). In FIG. 5, diffraction grating orders are represented by m, the axis of direct transmission 506 being represented by m=0, the first order being represented by m=1, and the second order 510 being represented by m=2. The periodic spacing of the diffraction grating grooves 502 is represented by a distance, d. A single wavelength of electromagnetic radiation is shown in FIG. 5 for the convenience of illustration and it is appreciated that during operation, received electromagnetic radiation may be composed of numerous wavelengths of electromagnetic radiation resulting in dispersion of numerous spectral bands. That is, while illustrated as a beam of radiation having a single wavelength, in various embodiments the electromagnetic radiation 504 may include polychromatic light resulting in the division of the polychromatic light into its constituent wavelength components.

Returning to FIG. 4, in various embodiments the spectral content, blaze angle, and/or composition of the diffraction grating 404 results in overlapping spectra between at least two of the dispersed spectral bands 420, and in some instances, overlapping spectra between three or more dispersed spectral bands 420. In such situations, the overlapping spectra typically corresponds to the respective spectral bands of two or more consecutive diffraction grating orders. For example, the overlapping spectra received at each pixel of the focal plane array 408 may include a first center wavelength of electromagnetic radiation from a first range of wavelengths within a first spectral band and a second center wavelength of electromagnetic radiation from a second range of wavelengths within a second spectral band. In such an example, the first spectral band may correspond to a first diffraction grating order (e.g., m=1) and the second spectral band may correspond to a second diffraction grating order (e.g., m=2). However, in certain other examples, the overlapping spectra may correspond to non-consecutive diffraction grating orders, such as the first diffraction grating order (e.g., m=1) and a third diffraction grating order (e.g., m=3). As discussed above, in contrast to typical approaches which suggest ignoring, filtering, or otherwise avoiding this overlapping spectral data, various aspects and examples use the focal plane array 408 to collect the overlapping spectral data, and in some instances, produce an image from the overlapping spectra.

As shown in the example of FIG. 4, the imaging spectrometer 400 may include focusing and/or imaging optics 412 interposed between the diffraction grating 404 and the focal plane array 408. Further, the spectrometer 400 may include an order sorting filter 416 interposed between the imaging optics 412 and the focal plane array 408. In certain embodiments, the imaging optics 412 may include one or more mirrors or lenses oriented to focus the one or more spectral bands, and in particular the overlapping spectra, onto the single-band focal plane array 408. For instance, the imaging optics 412 may include an imaging lens configured to direct the optical radiation to a focal plane of the imaging spectrometer 400.

In certain embodiments, the order sorting filter 416 may be configured to block unwanted electromagnetic radiation. For instance, the order sorting filter 416 may be configured to block overlapping spectra corresponding to diffraction grating orders above a predetermined limit. For example, the order sorting filter 416 may be configured to block the spectra from a third spectral band corresponding to a third diffraction grating order, the spectra from a fourth spectral band corresponding to a fourth diffraction grating order, and etc. Accordingly, in certain examples the order sorting filter 416 may be configured to transmit overlapping spectra within a desired passband, and block unwanted electromagnetic radiation (e.g., high order electromagnetic radiation) outside the passband. That is, unlike traditional spectrometer designs, the order sorting filter 416 illustrated in FIG. 4 may pass multiple octaves of electromagnetic radiation wavelengths.

Figure 6:
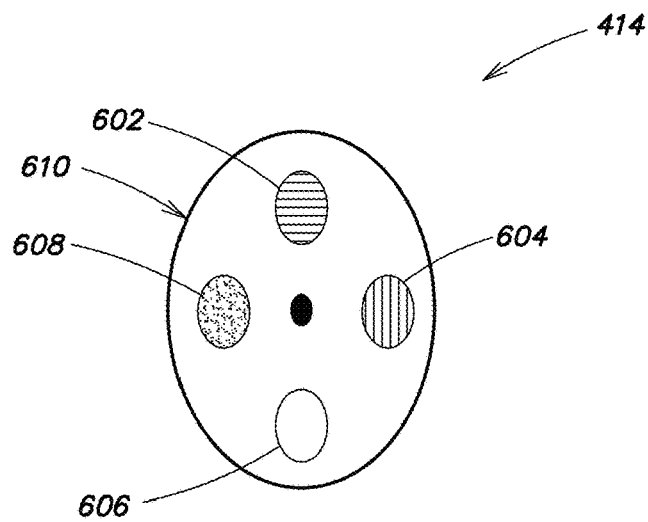
FIG. 6 is an illustration of an example filter system according to aspects of the invention.

In various embodiments, the imaging spectrometer 400 further includes a filter system 414. In the example of FIG. 4, the filter system 414 is oriented to directly receive the electromagnetic radiation 418 from the scene to be imaged. However, in various other implementations, the filter system 414 may be interposed between the foreoptics 402 and the slit aperture 406. FIG. 6 shows one example of the filter system 414 according to various aspects and implementations. As shown, the filter system 414 may include a filter wheel 610 having one or more filters arranged about a circumference of the filter wheel 610. Rotation of the filter system 414 along an axis of rotation may move and/or remove the filters from an optical axis of the imaging spectrometer 400 and a path of travel of the electromagnetic radiation. In the shown example, the filter wheel 610 includes a first filter 602 corresponding to a first spectral band, a second filter 604 corresponding to a second spectral band, and a third filter 606 corresponding to both the first spectral band and the second spectral band. Specifically, the third filter 606 may include a passband filter having a passband corresponding to a combined range of wavelengths of the first spectral band and the second spectral band. For example, the third filter 606 may pass substantially all impinging electromagnetic radiation. In FIG. 6, the filter wheel 610 is also shown as including a shutter 608.

Specifically, the filters of the filter system 414 may be configured to limit the range of wavelengths of the overlapping spectra received at the single-band focal plane array 408. For example, the first spectral band passed by the first filter 602 may correspond to the first diffraction grating order of the diffraction grating 404, and the second spectral band passed by the second filter 604 may correspond to the second diffraction grating order of the diffraction grating 404. Accordingly, the third filter 606 may pass the first range of wavelengths of the first spectral band dispersed by the diffraction grating 404 (e.g., a first order of wavelengths) and the second range of wavelengths of the second spectral band dispersed by the diffraction grating 404 (e.g., a second order of wavelengths). For purposes of explanation, the third filter 606 may have a band pass of 0.6 μm to 2.4 μm, the range of 1.2 μm to 2.4 μm corresponding to the first spectral band of the of the first filter 602 and the range of 0.6 μm to 1.2 μm corresponding to the second spectral band of the second filter 604. Electromagnetic radiation passed within the range of 0.6 μm to 2.4 μm will then be received at the diffraction grating 404 and dispersed into the first spectral band, 1.2 μm to 2.4 μm, and the second spectral band, 0.6 μm to 1.2 μm. As discussed, in this arrangement, the first spectral band passed through the third filter 606 may correspond to the first diffraction grating order, and the second spectral band passed through the third filter 606 may correspond to the second diffraction grating order.

Accordingly, operation of the filter system 414 enables the imaging spectrometer 400 to restrict the spectral bands, and in particular the orders of wavelengths of electromagnetic radiation, received at the single-band focal plane array 408. As discussed above with reference to FIG. 4, the order sorting filter 416 may further filter the received electromagnetic radiation. For instance, the order sorting filter 416 may be configured block electromagnetic radiation that while within the passband of the third filter 606, nevertheless corresponds to an undesired diffraction grating order, such as a higher diffraction grating order (e.g., m≥3).

Referring to FIG. 4, in the shown example the imaging spectrometer 400 may include an imaging detector configured and oriented to receive from the diffraction grating 404 overlapping spectra corresponding to at least two diffraction grating orders. As discussed above, in various embodiments the overlapping spectra corresponds to two consecutive diffraction grating orders (e.g., m=1 and m=2). However, in various examples the imaging detector may receive overlapping spectra corresponding to three, or more, diffraction grating orders. According to an example, the imaging detector may include a single-band panchromatic imaging detector, such as the single-band focal plane array 408 shown. The single-band focal plane array 408 may include one or more light-sensitive pixel elements and associated read-out integrated circuitry (ROIC). For instance, each pixel element may include a light-sensitive material that receives light and generates an electrical current based on the flux of radiation received. The ROIC includes an electronic circuit coupled to the individual pixel elements which is configured to capture the current during an exposure, and transfer the signal to other electronics (e.g., for storage). In various embodiments, the focal plane array 408 may include any combination of detector materials and/or ROICs to support particular spectral bands of interest. For example, the focal plane array 408 may be further configurable in that it may include monolithic or discrete detector materials and/or ROICs. For example, the focal plane array 408 may include a monolithic photo-detector coupled to a monolithic ROIC.

Despite being discussed herein as including a single-band focal plane array, in various embodiments the single-band focal plane array 408 is configured to provide multi-band functionality. That is, in various embodiments the single-band focal plane array 408 is configured to support imaging at wavelengths of two or more spectral bands simultaneously. In contrast to the various conventional approaches to multi-band imaging discussed above, which intentionally separate overlapping spectra in a spatial dimension or a spectral dimension, the single-band focal plane array 408 shown in FIG. 3 intentionally collects, and may image, overlapping spectral data. That is, in various examples the single-band focal plane array 408 of the imaging spectrometer 400 is configured to collect multiple nominal wavelengths per pixel element of the single-band focal plane array 408. Multiple configurations of the single-band focal plane array 408 may support any combination of overlapping spectra from the SWIR spectral band, the MWIR spectral band, the LWIR spectral band, the NIR spectral band, and/or the visible spectral band, to name a few.

Moreover, various embodiments of the single-band focal plane array 408 discussed herein provide multi-band functionality which was only previously achievable with a multi-waveband focal pane array, such as the arrangement described in U.S. Pat. No. 6,104,488 to LeVan. That is, various aspects and embodiments of the single-band focal plane array 408 do not require multiple layers of photosensitive material and/or ROIC unit cells, which would undesirably increase the size, weight, power consumption, and cost of the system. Moreover, various aspects and embodiments avoid the band-to-band cross-talk artifacts which typical multi-band devices undesirably experience.

Figure 7:
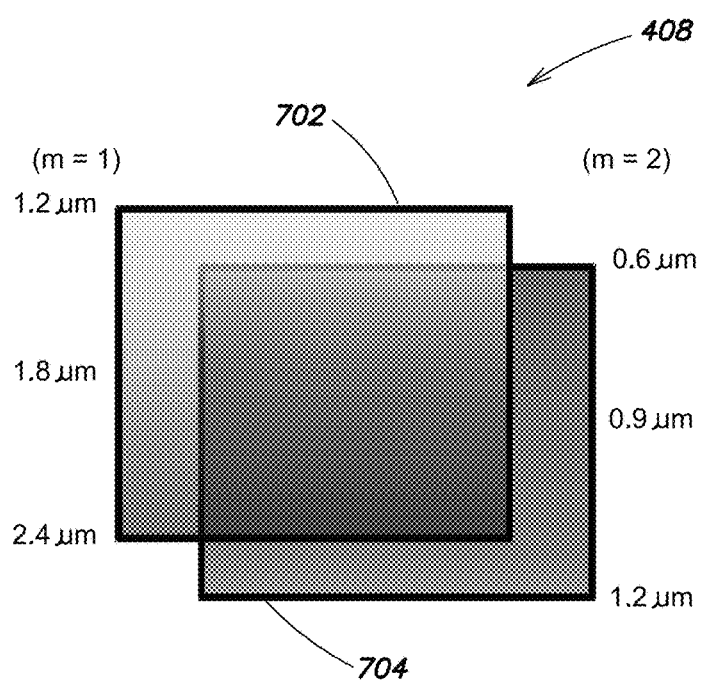
FIG. 7 is a diagram of one example of a focal plane array configuration according to aspects of the invention.

Referring to FIG. 7, shown is a diagram of one example of the single-band focal plane array 408 configuration according to aspects of the invention. In the shown example, the single-band focal plane array 408 is configured to support overlapping spectra from two spectral bands, each corresponding to a different diffraction grating order of the diffraction grating 404. In FIG. 7, the spectra are shown offset for the convenience of illustration; however, in practice the spectra may be completely overlapping at the focal plane array 308, and not offset. In the shown example, the respective spectrum of the first spectral band 702 corresponds to a diffracting grating order of one (m=1), and ranges from a minimum wavelength of 1.2 μm to a maximum wavelength of 2.4 μm. The respective spectrum of the second spectral band 704 corresponds to a diffracting grating order of two (m=2), and ranges from a minimum wavelength of 0.6 μm to a maximum wavelength of 1.2 μm. As shown, the received overlapping spectra respective to each spectral band 702, 704 may vary in wavelength in a spectral dimensions (e.g., illustrated as a vertical direction in FIG. 7), and remain constant in a spatial dimension (e.g., illustrated as a horizontal direction).

TABLES 1-4 provided below illustrate example configurations of the imaging spectrometer 400 according to various aspects and embodiments, and in particular example configurations of the single-band focal plane array 408. In particular, each of TABLES 1-4 illustrates a first configuration, "Configuration 1", and a second configuration, "Configuration 2", for collecting overlapping spectra from two spectral bands. Within each of TABLES 1-4, "Band A" corresponds to a first spectral band dispersed by the diffraction grating 404, and "Band B" corresponds to a second spectral band dispersed by the diffraction grating 404.

TABLE 4 illustrates example configurations for overlapping spectral from three spectral bands, "Band A", "Band B", and "Band C", respectively.

Within each TABLE, provided are the diffraction grating orders that correspond to the given spectral band, a minimum wavelength of each respective spectral band in μm, a maximum wavelength of each respective spectral band in μm, an example spectral range of the spectrometer 400, the number of rows in the single-band focal plane array 408, the spectral sampling interval in nm, and the number of spectral channels of the imaging spectrometer 400. It is appreciated that while TABLES 1-4 provide various example configurations, in further implementations, various other suitable arrangements may be used.

TABLE 1

|  | Configuration 1 | | Configuration 2 | |
| --- | --- | --- | --- | --- |
|  | Band A | Band B | Band A | Band B |
| Grating Diffraction Order | 2 | 1 | 2 | 1 |
| Minimum Wavelength, μm | 0.6 | 1.2 | 0.6 | 1.2 |
| Maximum Wavelength, μm | 1.2 | 2.4 | 1.2 | 2.4 |
| Spectrometer Spectral Range, octaves | 1 | 1 | 1 | 1 |
| Number of FPA Rows | 180 | | 120 | |
| Spectral Sampling Interval, nm | 3.3 | 6.7 | 5 | 10 |
| Number of Spectral Channels | 180 | 180 | 120 | 120 |

TABLE 1 provides example configurations for imaging overlapping spectra within the NIR spectral band (Band A) and the SWIR spectral band (Band B). In particular, the pixel elements of the single-band focal plane array 408 are configured to receive electromagnetic radiation of a wavelength approximately between 0.6 μm to 1.2 μm, while also receiving electromagnetic radiation of a wavelength approximately between 1.2 μm to 2.4 μm. Specifically, the pixel elements are configured to receive overlapping spectra in a spatial dimension and a spectral dimension, as illustrated above in FIG. 7. In TABLE 1, Band B may correspond to a diffraction grating order of two, and Band A may correspond to a diffraction grating order of one.

TABLE 2

|  | Configuration 1 | | Configuration 2 | |
| --- | --- | --- | --- | --- |
|  | Band A | Band B | Band A | Band B |
| Grating Diffraction Order | 2 | 1 | 2 | 1 |
| Minimum Wavelength, μm | 1.6 | 2.6 | 1.6 | 2.6 |
| Maximum Wavelength, μm | 2.6 | 5.2 | 2.6 | 5.2 |
| Spectrometer Spectral Range, octaves | 0.7 | 1 | 0.7 | 1 |
| Number of FPA Rows | 360 | | 260 | |
| Spectral Sampling Interval, nm | 3.6 | 7.2 | 5 | 10 |
| Number of Spectral Channels | 276 | 360 | 200 | 260 |

TABLE 2 provides configurations for imaging overlapping spectra within the SWIR spectral band (Band A) and the MWIR spectral band (Band B). In particular, the pixel elements of the single-band focal plane array 408 are configured to receive electromagnetic radiation of a wavelength approximately between 1.6 μm to 2.6 μm, while also receiving electromagnetic radiation of a wavelength approximately between 2.6 μm to 5.2 μm. In TABLE 2, Band B may correspond to a diffraction grating order of two, and Band A may correspond to a diffraction grating order of one.

TABLE 3

|  | Configuration 1 | | Configuration 2 | |
| --- | --- | --- | --- | --- |
|  | Band A | Band B | Band A | Band B |
| Grating Diffraction Order | 2 | 1 | 2 | 1 |
| Minimum Wavelength, μm | 3.5 | 6.25 | 3.5 | 6.25 |
| Maximum Wavelength, μm | 6.25 | 12.5 | 6.25 | 12.5 |
| Spectrometer Spectral Range, octaves | 0.8 | 1 | 0.8 | 1 |
| Number of FPA Rows | 360 | | 250 | |
| Spectral Sampling Interval, nm | 8.7 | 17.4 | 12.5 | 25 |
| Number of Spectral Channels | 316 | 360 | 220 | 250 |

In particular, TABLE 3 provides configurations for imaging overlapping spectra within the MWIR spectral band (Band A) and the LWIR spectral band (Band B). In particular, the pixel elements of the single-band focal plane array 408 are configured to receive electromagnetic radiation of a wavelength approximately between 3.5 μm to 6.25 μm, while also receiving electromagnetic radiation of a wavelength approximately between 6.25 μm to 12.5 μm. In TABLE 3, Band B may correspond to a diffraction grating order of two, and Band A may correspond to a diffraction grating order of one.

TABLE 4

|  | Configuration 1 | | | Configuration 2 | | |
| --- | --- | --- | --- | --- | --- | --- |
|  | Band A | Band B | Band C | Band A | Band B | Band C |
| Grating Diffraction Order | 3 | 2 | 1 | 3 | 2 | 1 |
| Minimum Wavelength, μm | 0.5 | 0.75 | 1.5 | 0.5 | 0.75 | 1.5 |
| Maximum Wavelength, μm | 0.83 | 1.25 | 2.5 | 0.83 | 1.25 | 2.5 |
| Spectrometer Spectral Range, octaves | 0.7 | 0.7 | 0.7 | 0.7 | 0.7 | 0.7 |
| Number of FPA Rows | 200 | | | 100 | | |
| Spectral Sampling Interval, nm | 1.7 | 2.5 | 5 | 3.3 | 5 | 10 |
| Number of Spectral Channels | 200 | 200 | 200 | 100 | 100 | 100 |

In particular, TABLE 4 provides configurations for imaging overlapping spectra within the NIR spectral band (Band A), a first portion of the SWIR spectral band (Band B), and a second portion of the SWIR spectral band (Band C). In particular, the pixel elements of the single-band focal plane array 408 are configured to receive electromagnetic radiation of a wavelength approximately between 0.5 μm to 0.83 μm, while also receiving electromagnetic radiation of a wavelength approximately between 0.75 μm to 1.25 μm and between 1.5 μm to 2.5 μm. In TABLE 4, Band C may correspond to a diffraction grating order of one, Band B may correspond to a diffraction grating order of two, and Band A may correspond to a diffraction grating order of three.

As discussed above, in various embodiments the imaging spectrometer 400 may produce an image based at least in part on the overlapping spectra received. For example, the ROIC coupled to each pixel element of the focal plane array 408 may provide one or more read-out values corresponding to the electromagnetic radiation received. The resulting electrical current from the ROIC may be conveyed by additional circuitry to an output of the single-band focal plane array 408, which may be used to construct an image. In at least one example, the imaging spectrometer 400, or downstream components, may perform one or more imaging processes to de-convolve the overlapping spectral data.

Figure 8:
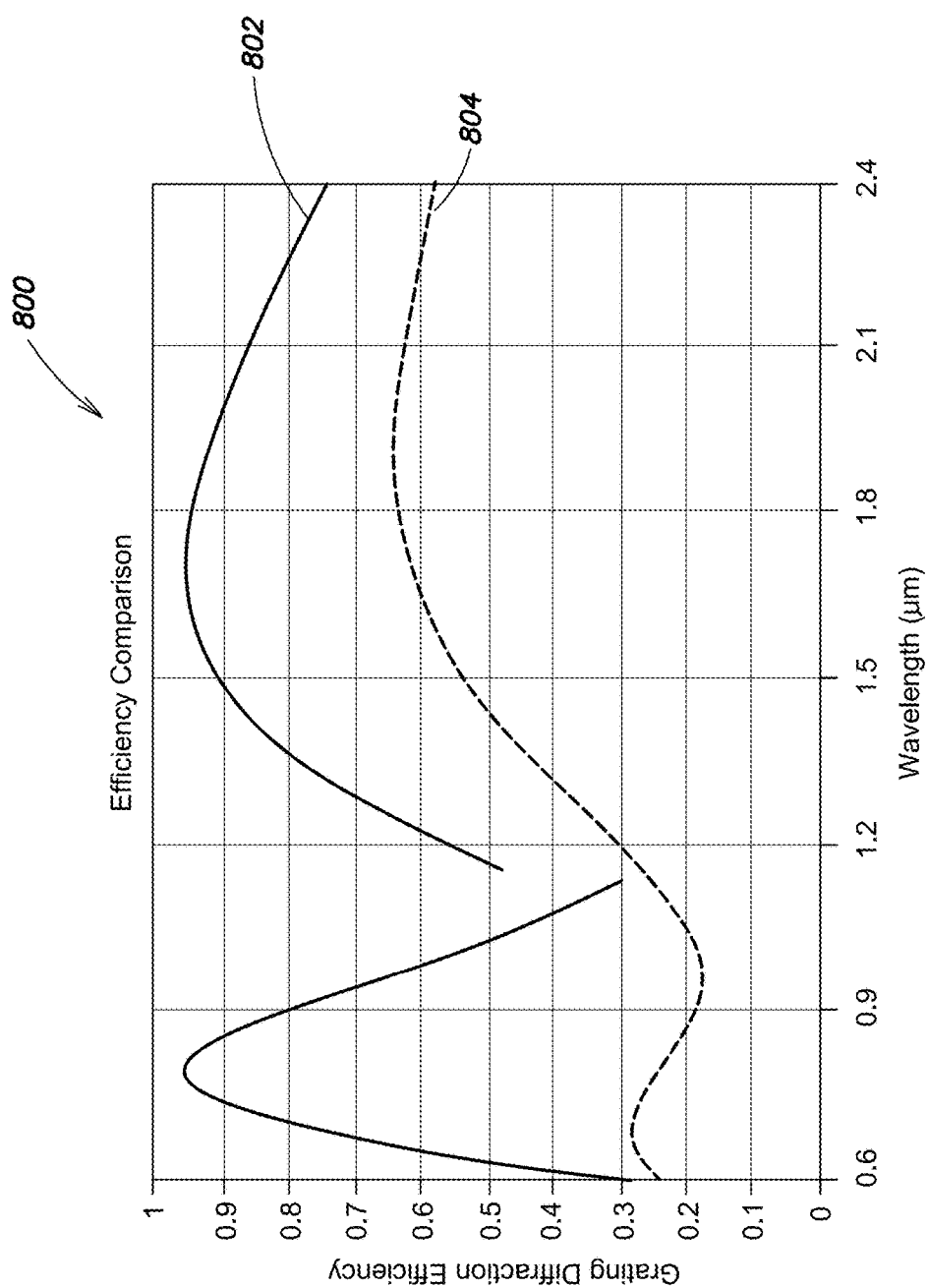
FIG. 8 is an illustration of grating diffraction efficiency according to aspects of the invention.

Referring to FIG. 8, shown is a plot 800 comparing the grating diffraction efficiency for at least one improved imaging spectrometer, as discussed herein, and a conventional multi-spectral imaging spectrometer. In the shown plot, grating diffraction efficiency (represented in percentage) is plotted against a wavelength of electromagnetic radiation received (in units of µm). Performance for an improved imaging spectrometer, such as the imaging spectrometer 400 shown in FIG. 4, is represented by a first trace 802, and performance for a typical multi-spectral imaging spectrometer is illustrated by a second trace 804. As the plot of FIG. 9 demonstrates, the improved imaging spectrometer modeled allows significant improvements in efficiency over the entire range of compared wavelengths. In particular, intentionally received overlapping spectral data reduces the need to spatially separate desired spectral bands, which would generally reduce grating efficiency in a typical spectrometer. Further, intentionally received overlapping spectral data increases the electromagnetic energy received per spectral bin, reducing the effect of sensor noise and permitting near shot-noise limited performance. Increased grating diffraction efficiency also allows wide area coverage rates, as area may be increased without the same penalty to efficiency that a typical spectrometer would experience.

Figure 9:
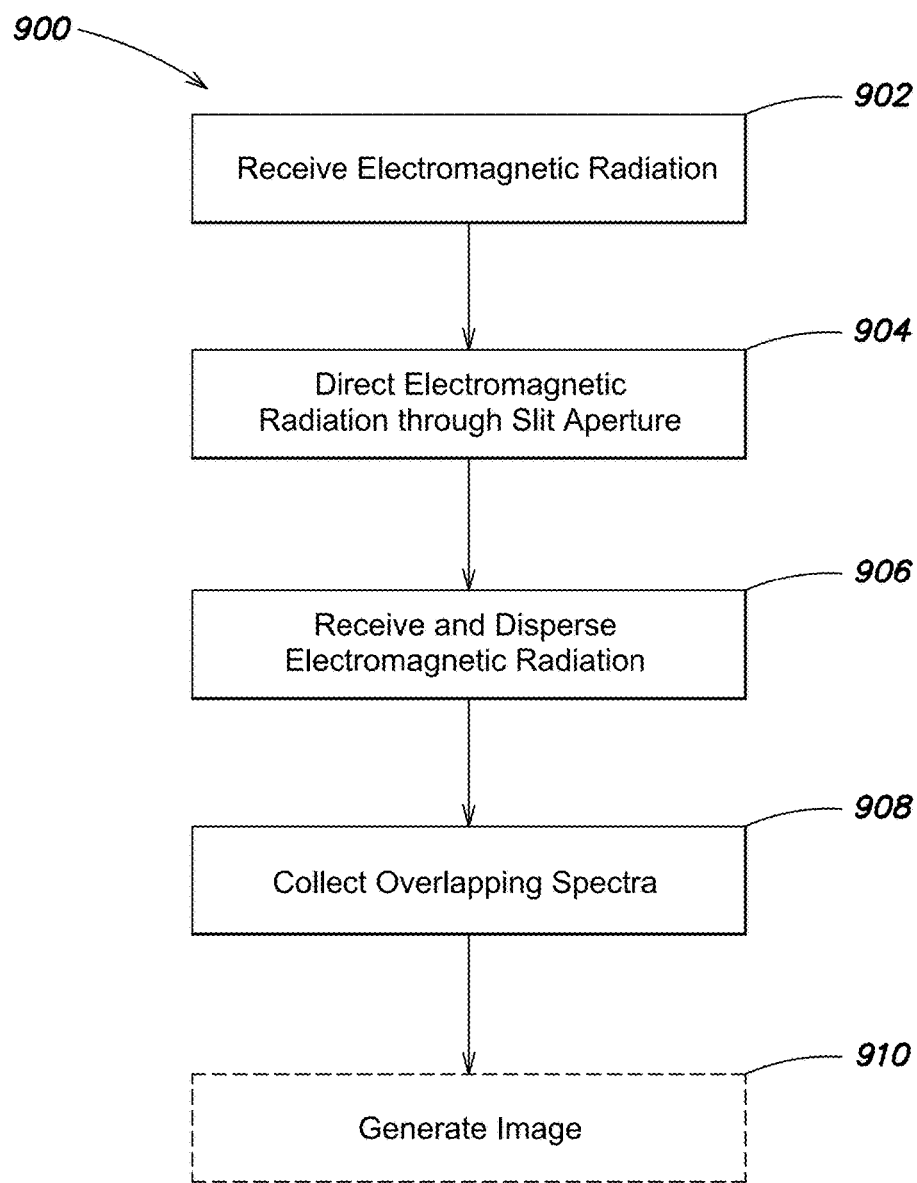
FIG. 9 is a process flow of one example of an imaging spectrometer method according to aspects of the invention.

As described above with reference to at least FIGS. 3-7, several aspects and examples perform processes for multi-spectral imaging, and in particular, collecting overlapping spectra received from a diffraction grating. One example of such a process is illustrated in FIG. 9. Process 900 is discussed with reference to the example imaging spectrometer 400 shown in FIG. 4, and the various components thereof. According to the shown example, the process 900 may include acts of receiving electromagnetic radiation, directing the electromagnetic radiation through a single slit aperture, receiving and dispersing the electromagnetic radiation at a diffraction grating, and collecting the overlapping spectra at an imaging detector. In further examples, the process 900 may also include the act of generating an image based at least in part on the overlapping spectra.

In act 902, the process 900 may include receiving electromagnetic radiation from a scene to be imaged. For example, the process 900 may include receiving electromagnetic radiation released from the scene to be imaged at foreoptics of the imaging spectrometer (e.g., foreoptics 402 shown in FIG. 4). As discussed herein, the electromagnetic energy may include visible light, infrared radiation, and/or ultraviolet radiation, among radiation of other wavelengths. In various embodiments, the process 900 may further include filtering the electromagnetic radiation collected by the imaging spectrometer at one or more filters of a filter system, such as the filter system 414 of FIG. 4. While in one instance, the filter system may directly receive and filter the electromagnetic radiation before the radiation is received by the foreoptics, in certain other examples, the filter system may be interposed between the foreoptics and the aperture slit, for example at an entrance pupil of the imaging spectrometer. In this arrangement, the process 900 may include filtering the electromagnetic radiation after receiving the electromagnetic radiation at the foreoptics.

In various embodiments, the process 900 may further include displacing the filter system to selectively move and/or remove one or more of the filters from an optical axis of the imaging spectrometer and a path of travel of the electromagnetic radiation. As discussed above, in one example the filter system may include a filter wheel having the plurality of filters arranged about a circumference of the filter wheel. In such an example, displacement of the filter system may include rotation of the filter wheel. Once the electromagnetic radiation has been received at the filter system, filtering the electromagnetic radiation at the filter system may include transmitting electromagnetic radiation having a wavelength within a passband of the respective receiving filter. Specifically, in one example the passband may correspond to a combined range of wavelengths of a first spectral band dispersed by the diffraction grating and a second spectral band dispersed by the diffraction grating, as discussed above with reference to at least FIG. 4.

In act 904, the process 900 may include directing the electromagnetic radiation through the slit aperture to the diffraction grating. For instance, act 904 may include receiving the electromagnetic radiation from the foreoptics (and/or the filter system) at the single slit aperture, and transmitting the electromagnetic radiation which passes through the slit aperture to the diffraction grating. As also shown in FIG. 4, in various embodiments the imaging spectrometer may include collimating optics interposed between the slit aperture and the diffraction grating. Accordingly, in some examples the process 900 may further include collimating the electromagnetic radiation directed by the slit aperture.

In act 906, the process 900 may include receiving the electromagnetic radiation at the diffraction grating, and dispersing the electromagnetic radiation into a plurality of spectral bands. Each dispersed spectral band may correspond to a diffraction grating order of the diffraction grating. For instance, dispersing the electromagnetic radiation into a plurality of spectral bands may include dispersing the electromagnetic radiation into at least a first spectral band including a first range of wavelengths and a second spectral band including a second range of wavelengths. In such an embodiment, the first spectral band may correspond to a first diffraction grating order and the second spectral band may correspond to a second diffraction grating order.

In act 908, the process 900 may include simultaneously collecting, at the single-band focal plane array, overlapping spectra corresponding to at least two diffraction grating orders of the diffracting grating. For instance, the overlapping spectra may include wavelengths of electromagnetic radiation within the first spectral band and wavelengths of electromagnetic radiation within the second spectral band. Accordingly, in various embodiments simultaneously collecting the overlapping spectra further includes receiving at least a first center wavelength of electromagnetic radiation within the first range of wavelengths, and receiving at least a second center wavelength of electromagnetic radiation within the second range of wavelengths, at one or more pixel element of the single-band focal plane array.

In at least one further example, dispersing the electromagnetic radiation into a plurality of spectral bands includes dispersing the received electromagnetic radiation into three or more distinct spectral bands, each spectral band associated with a particular diffraction grating order. In such an instance, the overlapping spectra may include at least one wavelength of electromagnetic radiation from a first range of wavelengths of the first spectral band, at least one wavelength of electromagnetic radiation from a second range of wavelengths of the second spectral band, and at least one wavelength of electromagnetic radiation from a third range of wavelengths of the third spectral band. Accordingly, the act of collecting overlapping spectra corresponding to at least two diffraction grating orders at the single-band focal plane array may include collecting overlapping spectra corresponding to three or more diffraction grating orders at the single-band focal plane array.

In certain examples, the process 900 may also include generating an image from at least the overlapping spectra (act 910). For example, the ROIC coupled to each pixel element of the focal plane array may provide one or more read-out values corresponding to the overlapping spectra received. The process 900 may include conveying the resulting electrical current from the ROIC to an output of the single-band focal plane array by additional circuitry. The conveyed electrical current may be used to construct an image. In at least one example, the imaging spectrometer, or downstream components, may perform one or more imaging acts to de-convolve the overlapping spectral data.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging spectrometer comprising:
   foreoptics positioned to receive electromagnetic radiation from a scene;
   a diffraction grating positioned to receive the electromagnetic radiation from the foreoptics and configured to disperse the electromagnetic radiation into a plurality of spectral bands, each spectral band corresponding to a diffraction grating order of the diffraction grating;
   a slit aperture interposed between the foreoptics and the diffraction grating and configured to direct the electromagnetic radiation to the diffraction grating; and
   a single-band focal plane array including a plurality of pixel elements, each pixel element of the plurality of pixel elements being configured to simultaneously receive from the diffraction grating overlapping spectra in a spatial dimension and a spectral dimension, the single-band focal plane array being thereby configured to receive multiple nominal wavelengths per spectral channel of the single-band focal plane array, wherein the overlapping spectra correspond to at least two diffraction grating orders.

2. The imaging spectrometer according to claim 1, wherein the plurality of spectral bands includes at least a first spectral band and a second spectral band, the first spectral band including a first range of wavelengths, and the second spectral band including a second range of wavelengths.

3. The imaging spectrometer according to claim 2, wherein in simultaneously receiving the overlapping spectra, at least one pixel element of the plurality of pixel elements is configured to simultaneously receive a first center wavelength of electromagnetic radiation within the first range of wavelengths and a second center wavelength of electromagnetic radiation within the second range of wavelengths.

4. The imaging spectrometer according to claim 3, further comprising a filter system configured to direct the electromagnetic radiation to the foreoptics, the filter system including at least a first filter having a first passband corresponding to the first range of wavelengths and the second range of wavelengths.

5. The imaging spectrometer according to claim 4, wherein the filter system further includes a second filter having a second passband corresponding to the first range of wavelengths and a third filter having a third passband corresponding to the second range of wavelengths.

6. The imaging spectrometer according to claim 5, wherein the filter system is a filter wheel positioned to selectively receive the electromagnetic radiation at one of the first filter, the second filter, and the third filter.

7. The imaging spectrometer according to claim 2, wherein the plurality of spectral bands further includes a third spectral band, the third spectral band including a third range of wavelengths.

8. The imaging spectrometer according to claim 7, wherein in simultaneously receiving the overlapping spectra, at least one pixel element of the plurality of pixel elements is configured to simultaneously receive a first center wavelength of electromagnetic radiation within the first range of wavelengths, a second center wavelength of electromagnetic radiation within the second range of wavelengths, and a third center wavelength of electromagnetic radiation within the third range of wavelengths.

9. The imaging spectrometer according to claim 2, wherein the first spectral band includes at least one of the near-infrared spectral band, the short-wavelength infrared spectral band, the mid-wavelength infrared spectral band, the long-wavelength infrared spectral band, and the visible spectral band, and wherein the second spectral band includes at least one of the near-infrared spectral band, the short-wavelength infrared spectral band, the mid-wavelength infrared spectral band, the long-wavelength infrared spectral band, and the visible spectral band.

10. The imaging spectrometer according to claim 1, wherein the at least two diffraction grating orders include a pair of consecutive diffraction grating orders.

11. The imaging spectrometer according to claim 1, wherein the at least two diffraction grating orders include a pair of non-consecutive diffraction grating orders.

12. An imaging method, the method comprising:
    receiving electromagnetic radiation from a scene;
    directing the electromagnetic radiation onto a diffraction grating using a slit aperture;
    receiving the electromagnetic radiation at the diffraction grating and dispersing the electromagnetic radiation into a plurality of spectral bands, each spectral band corresponding to a diffraction grating order of the diffraction grating; and
    simultaneously collecting at each pixel element of a single-band focal plane array overlapping spectra in a spatial dimension and a spectral dimension, wherein the overlapping spectra correspond to at least two diffraction grating orders of the diffraction grating, and wherein collecting the overlapping spectra in the spatial dimension and the spectral dimension includes receiving multiple nominal wavelengths per spectral channel of the single-band focal plane array.

13. The imaging method according to claim 12, wherein dispersing the electromagnetic radiation into a plurality of spectral bands includes dispersing the electromagnetic radiation into at least a first spectral band including a first range of wavelengths and a second spectral band including a second range of wavelengths.

14. The imaging method according to claim 13, wherein simultaneously collecting the overlapping spectra further includes receiving a first center wavelength of electromagnetic radiation within the first range of wavelengths and receiving a second center wavelength of electromagnetic radiation within the second range of wavelengths at one or more of the pixel elements of the single-band focal plane array.

15. The imaging method according to claim 14, further comprising filtering the received electromagnetic radiation with a filter having a passband corresponding to the first range of wavelengths and the second range of wavelengths.

16. The imaging method according to claim 13, wherein dispersing the electromagnetic radiation into a plurality of spectral bands further includes dispersing the electromagnetic radiation into a third spectral band including a third range of wavelengths.

17. The imaging method according to claim 16, wherein simultaneously collecting the overlapping spectra further includes receiving a first center wavelength of electromagnetic radiation within the first range of wavelengths, receiving a second center wavelength of electromagnetic radiation within the second range of wavelengths, and simultaneously receiving a third center wavelength of electromagnetic radiation within the third range of wavelengths, at one or more of the pixel elements of the single-band focal plane array.

18. The imaging method according to claim 13, wherein the first spectral band includes at least one of the near-infrared spectral band, the short-wavelength infrared spectral band, the mid-wavelength infrared spectral band, the long-wavelength infrared spectral band, and the visible spectral band, and wherein the second spectral band includes at least one of the near-infrared spectral band, the short-wavelength infrared spectral band, the mid-wavelength infrared spectral band, the long-wavelength infrared spectral band, and the visible spectral band.

19. The imaging method according to claim 12, wherein receiving electromagnetic radiation from the scene includes selectively positioning at least one filter to receive and direct the electromagnetic radiation.

\* \* \* \* \*